United States Patent
Tenbusch, II

(10) Patent No.: US 7,390,143 B1
(45) Date of Patent: Jun. 24, 2008

(54) ARTICULATED LEAD FOR TRENCHLESS PIPE REPLACEMENT

(76) Inventor: Albert A. Tenbusch, II, P.O. Box 417, Lewisville, TX (US) 75067

( * ) Notice: Subject to any disclaimer, the term of this patent is extended or adjusted under 35 U.S.C. 154(b) by 0 days.

(21) Appl. No.: 11/786,375

(22) Filed: Apr. 11, 2007

Related U.S. Application Data

(60) Provisional application No. 60/791,585, filed on Apr. 12, 2006.

(51) Int. Cl.
*F16L 55/18* (2006.01)
(52) U.S. Cl. .................. 405/184.3; 405/184.1; 405/156; 138/97
(58) Field of Classification Search ... 405/184.1–184.3, 405/156; 138/97
See application file for complete search history.

(56) References Cited

U.S. PATENT DOCUMENTS

| | | | | | |
|---|---|---|---|---|---|
| 4,848,964 | A | * | 7/1989 | Yarnell | 405/184.3 |
| 5,192,165 | A | * | 3/1993 | Torielli | 405/156 |
| 5,482,404 | A | * | 1/1996 | Tenbusch, II | 405/184.3 |
| 5,816,745 | A | * | 10/1998 | Tenbusch, II | 405/184.3 |
| 6,585,453 | B2 | * | 7/2003 | Robinson | 405/184.3 |
| 6,588,983 | B1 | * | 7/2003 | Tenbusch, II | 405/184.3 |

* cited by examiner

*Primary Examiner*—Frederick L Lagman
(74) *Attorney, Agent, or Firm*—Roger N. Chauza, P.C.

(57) ABSTRACT

Trenchless pipe replacement apparatus equipped with articulated lead sections that flex and accommodate an irregular path of an old pipe line. The articulated lead sections are coupled together by a flexible joint that allows the lead section assembly to flex and follow the path of the old pipe line that may be irregular due to misaligned pipe sections, dropped joints and other irregularities.

15 Claims, 4 Drawing Sheets

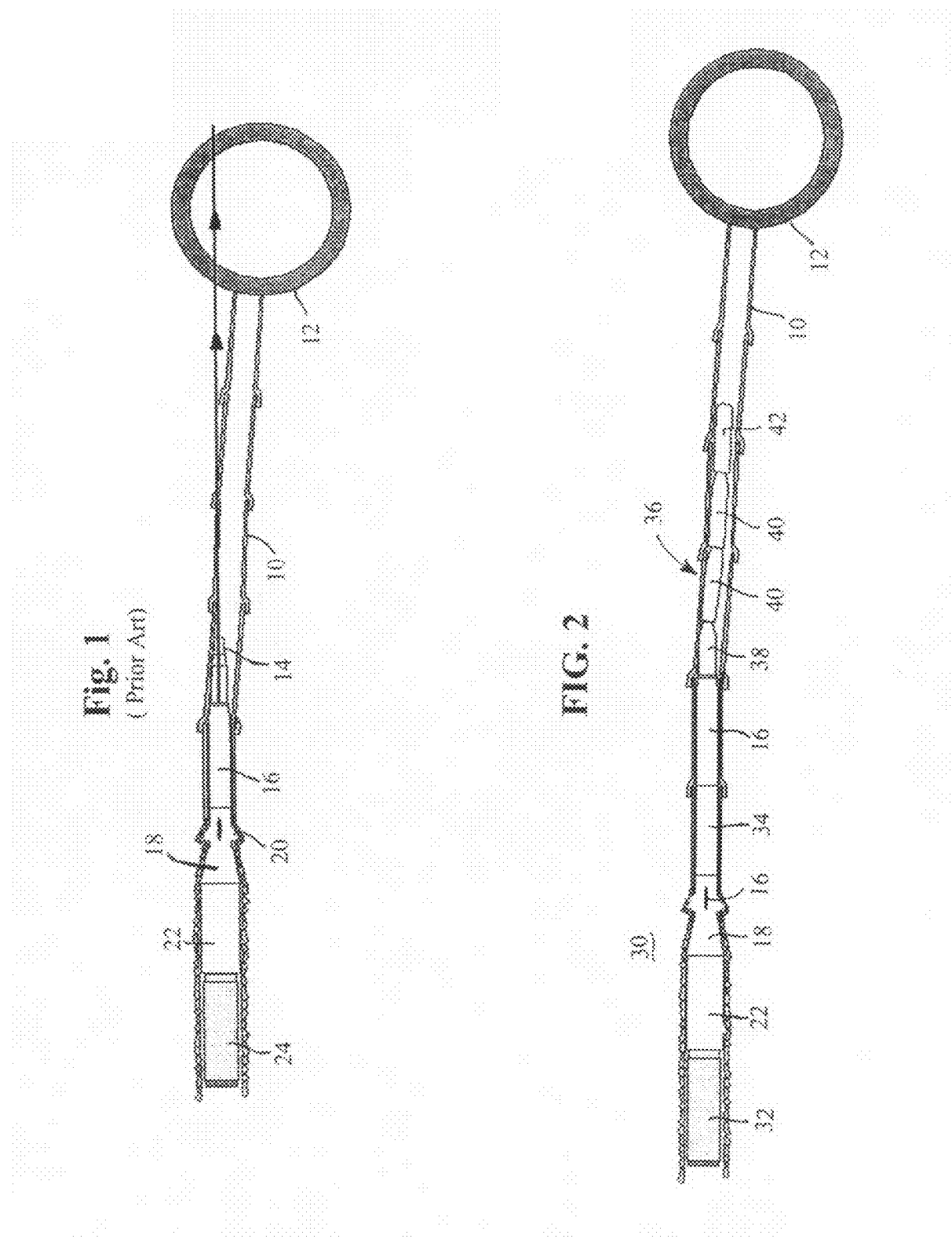

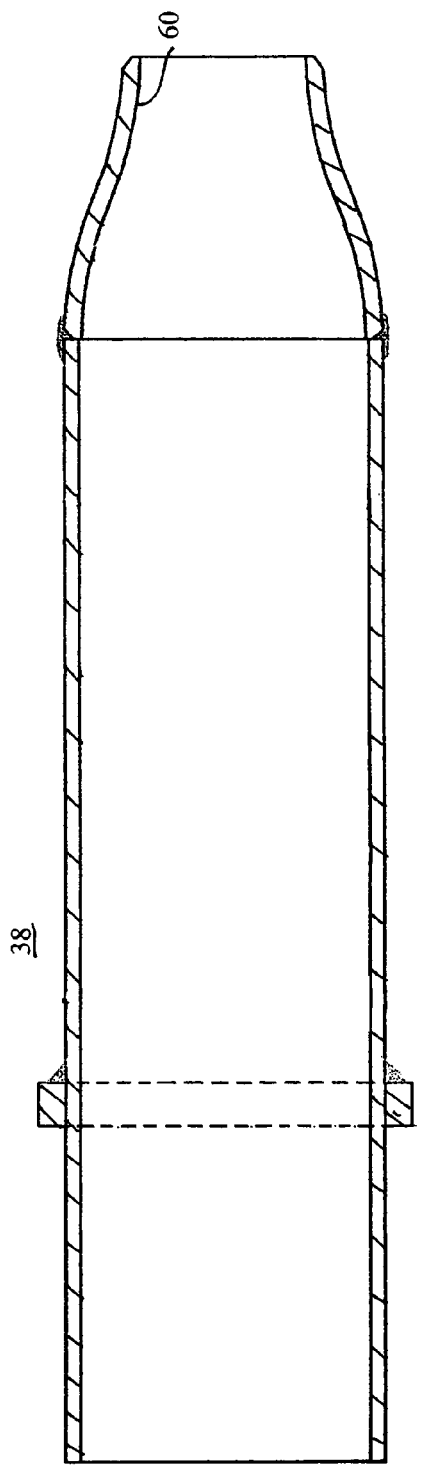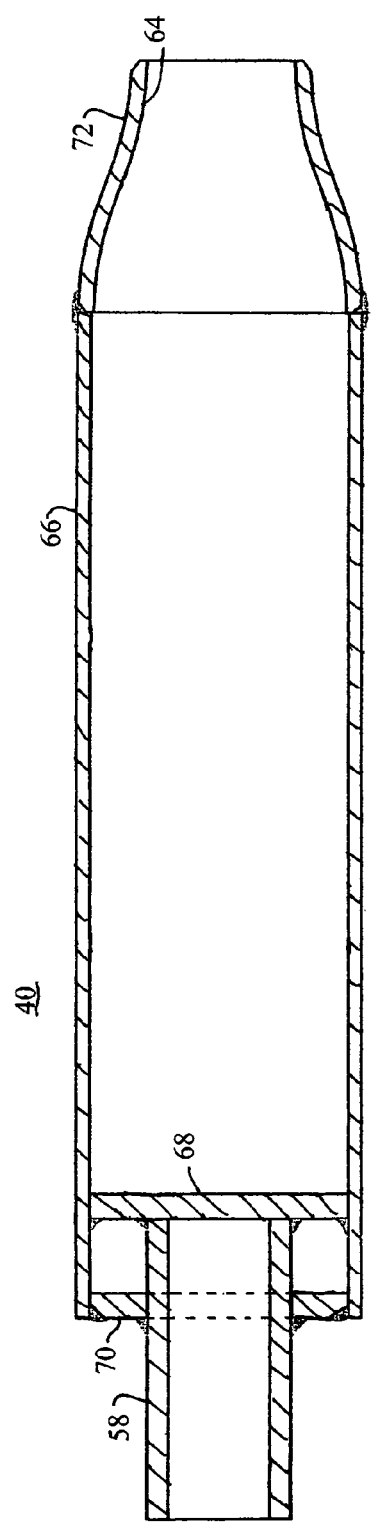

US 7,390,143 B1

ARTICULATED LEAD FOR TRENCHLESS PIPE REPLACEMENT

RELATED APPLICATIONS

This non-provisional patent application claims the benefit of now abandoned U.S. provisional patent application No. 60/791,585, filed Apr. 12, 2006, the disclosure of which is incorporated herein by reference.

TECHNICAL FIELD OF THE INVENTION

The present invention relates in general to pipe replacement techniques, and more particularly to trenchless underground pipe replacement techniques.

BACKGROUND OF THE INVENTION

Cities of all sizes in the United States employ sewer and other liquid carrying systems for transporting liquid wastes to treatment plants for the disposal thereof. The infrastructure for carrying liquid wastes includes a vast network of underground pipes. The underground pipes can be constructed of many types of material, including clay, metal, cement, plastic, etc. Irrespective of the type of material from which the pipe network is constructed, the pipes deteriorate over time and thus need replacement. Certain pipes can last over 100 years, while other types of pipes may last only 25 years or so.

One technique for replacing old and deteriorated underground pipes includes excavating an open trench to expose the pipe line, and then replacing the old pipes with new pipes. While this technique has been employed for years, it is time consuming, labor intensive and frequently disrupts traffic, if a street or alley requires excavation in order to expose the underlying pipes. Moreover, the street or alley cannot often be immediately repaired until the newly filled trench has settled or otherwise is in condition for the pouring of concrete or laying of asphalt over the trenched area.

Misaligned joints of old underground pipes, cracked pipe sections, and either a complete or partial collapse of the pipe line, are all conditions that frequently exist in municipal wastewater systems. Utility owners are increasingly searching for alternatives to traditional open-cut replacement methods for such failing infrastructure.

Existing pipe lines often have horizontal and/or vertical bends or curves, resulting from dropped joints and/or dramatic elevation changes that can disrupt pipe replacement methods. When a video camera is able to penetrate the existing pipe line to determine that the path is irregular and no longer linear, the best option has been to dig a work pit at the grade or line change location. When the camera is not able to penetrate the old pipe line because of its highly irregular path, the options have been limited to making point repairs prior to using existing trenchless methods, or to revert to traditional open cut methods.

As a significant improvement to the traditional pipe replacement techniques, improved trenchless pipe replacement techniques are disclosed in U.S. Pat. Nos. 5,482,404; 5,816,745 and 6,588,983, the disclosures of which are incorporated herein by reference. This methodology uses the technique of pushing new replacement pipes 24 behind a cone expander 18, through the old pipe line 10 that is being replaced. The trenchless pipe replacing apparatus is shown in FIG. 1, being pushed through an old pipe line 10 toward a manhole 12. The old pipe line 10 is shown curved and irregular, as is the case with many old pipe lines. Pipe replacement is accomplished without using percussion or vibration, and there are no rotating parts. In order to guide the new pipe 24 through the old pipe 10, a multi-component lead train is employed. The lead train includes a lead section 14 that "noses" its way through the path of the old deteriorated pipe 10. A cracker lead 16 functions as a guide behind the lead section 14. There may be a cracker extension (not shown) that effectively extends the length of the cracker lead 16. The cracker lead 16 begins and straightens the path of the old underground pipe 10. Coupled behind the cracker lead 16 is a cracker/cone 18. The leading or frontal portion of this section 18 is fitted with fins 20 placed radially and in a staggered manner. The rear half of the cracker/cone 18 is a concentric cone that fractures the old pipe 10 and expands it radially outwardly into the surrounding dirt. A trailing sleeve 22 is attached to the back of the cracker/cone 18 and makes the two components 18 and 22 rigid with each another as a unit. This rigidity precludes the assembly from reacting to and following every "wiggle" in the old pipe line 10. As shown in FIG. 1 the rigid lead train may exit the irregular path of the old pipe 10 and form a burrow outside the old pipe 10. Should this occur, the pipe replacement operation must be halted due to failure to replace the old pipe.

The rear of the trailing sleeve 22 is fitted with a specific adapter to interface with the new pipe 24 being pushed into the old pipe 10. There can be a lubricant port on the trailing end of the trailing sleeve 22. While not shown, a jacking frame, including a heavy duty hydraulic jack, is employed to exert a force on the back of the new pipe 24, and force it, and the lead train, into the old pipe 10. Once a section of the new pipe 24 has been fully inserted into and in replacement of the old pipe 10, the plunger or cylinder of the jack is retracted and another new pipe section is fitted behind the previously inserted new pipe 24, and the jack pushes the second new pipe section forward, thus pushing the previous pipe and the lead train to advance the apparatus through the path of the old pipe 10. This continues until the front-most new pipe 24 emerges through the old pipe 10 in a downstream manhole 12, whereupon the old pipe line 10 has been completely replaced with new pipe sections.

During the time when the jack is pushing the lead train forward, the fins 20 attached around the cracker/cone 18 rip and break the old pipe 10 as well as any repair clamps or saddles. These fins 20 have been found to point load and break concrete encasement where the concrete is not substantial or is not reinforced. For most pipe replacement conditions, the appropriate cone expander 18 will be concentric, however when certain existing conditions dictate, an eccentric cone expander (not shown) can be used. An eccentric cone expander is used whenever it is expected that the radial expansion of the cone as it moves forward will not expand downward uniformly in all radial directions, i.e. due to an existing rock floor at the bottom of the trench.

In some cases a front jack will be used instead of the trailing sleeve 22. In this case, both a front and rear jack will be employed. It should be noted that with the front jack (a single acting hydraulic cylinder), the frontal components of the lead train can be advanced without advancing the new pipe column. Because of the superior column loading capability of rigid pipe products that are currently available, the front jack is used only when substantially upsizing of the new pipe is desired, as compared to the old pipe, or when the push is long, or the existing ground condition is a hard consolidated material. Whenever the front jack is used there is a pipe adapter which provides a mating surface that allows the front jack to interface with the new pipe column. The lubricant port on the trailing end of the trailing sleeve allows the introduction of lubricant. The lubricant can be of any type, but preferably bentonite, a polymer, or a mixture of both. By introducing a lubricant around the annular space of the new pipe column, the force necessary to advance the column is maintained at a minimum.

The foregoing technique functions very well for many old pipe lines, even pipe lines with gentle or gradual curves. In this event, the gently curbed pipe line may even be straightened due to the rigidity of the coupling between the components of the lead train.

When the lead train components of the pipe train of FIG. 1 are joined together, a rigid assembly is formed. This rigid train of components can be about nine to twelve feet long, and because of its length and rigidity, it cannot navigate the "wiggles" that may exist in many old pipe lines. Stated another way, this rigid assembly will follow the general path of the old pipe line, however it will not follow every misaligned joint. The problem is exacerbated when the old pipe line is situated in soft soil or in sandy conditions. In old pipe lines where misalignment of pipe sections exists, or where the old pipe line is characterized by a curved or meandering path, the path must first be straightened and any misalignment corrected in order to accommodate the new rigid pipe that replaces the old pipe line.

From the foregoing, it can be seen that a need exists for a new trenchless technique, and apparatus, for replacing old pipe lines characterized by irregular paths. Another need exists for a lead train that can follow an irregular path of an old pipe line and replace the same with new pipes, without correcting the irregular path. Yet another need exists for a lead train that is not rigid, but with components that can move with respect to each other so that it can follow an irregular path.

SUMMARY OF THE INVENTION

In accordance with the principles and concepts of the invention, there is disclosed a lead train where at least two components can articulate with respect to each other to accommodate an irregular pipe line path.

In accordance with one feature of the invention, the components of the lead train are articulated in such a manner as to be able to be redirected in any direction to accommodate the irregular path of an old pipe line.

In accordance with one embodiment of the invention, disclosed is underground pipe replacement apparatus, which includes a cone adapted for being forced through old underground pipe. Further included is a lead section assembly that is located in front of the cone, where the lead section assembly includes two or more lead section components connected together in a series. The two lead section components are coupled together with a flexible joint for allowing the lead section components to flex and follow an irregular path of the old underground pipe.

With regard to another embodiment of the invention, disclosed is underground pipe replacement apparatus that is adapted for use with a cone expander. The apparatus includes a first lead section coupled to a second lead section, where the first and second lead sections are situated in front of the cone expander. One of the first or second lead section has a reducer attached thereto, and the other of the first or second lead section has a stub pipe attached thereto. When the stub pipe is inserted into the reducer, the first and second lead sections can be articulated with respect to each other.

According to a method of the invention, disclosed are the steps of replacing old underground pipes with new pipes, forcing pipe replacement apparatus in the path of old underground pipe to break up the old pipe into pieces, and pushing the old pipe pieces into the surrounding ground. A path of the old underground pipe is followed with articulated lead sections of the pipe replacement apparatus, whereby when the path of the old underground pipe departs from a linear path, the articulated lead sections of the pipe replacement apparatus follow the path and bring with it the remainder of the underground pipe replacement apparatus.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 1 is a top view of conventional trenchless pipe replacement equipment operating in a non-linear arrangement of underground pipes;

FIG. 2 is a top view of the trenchless pipe replacement apparatus according to one embodiment of the invention, operating in an irregular path taken by the underground pipe line;

FIG. 4 is a cross-sectional view of an articulated transition section of the lead train according to the invention;

FIG. 5 is a cross-sectional view of an articulated lead section of the lead train according to the invention;

DETAILED DESCRIPTION OF THE INVENTION

Figure 3:
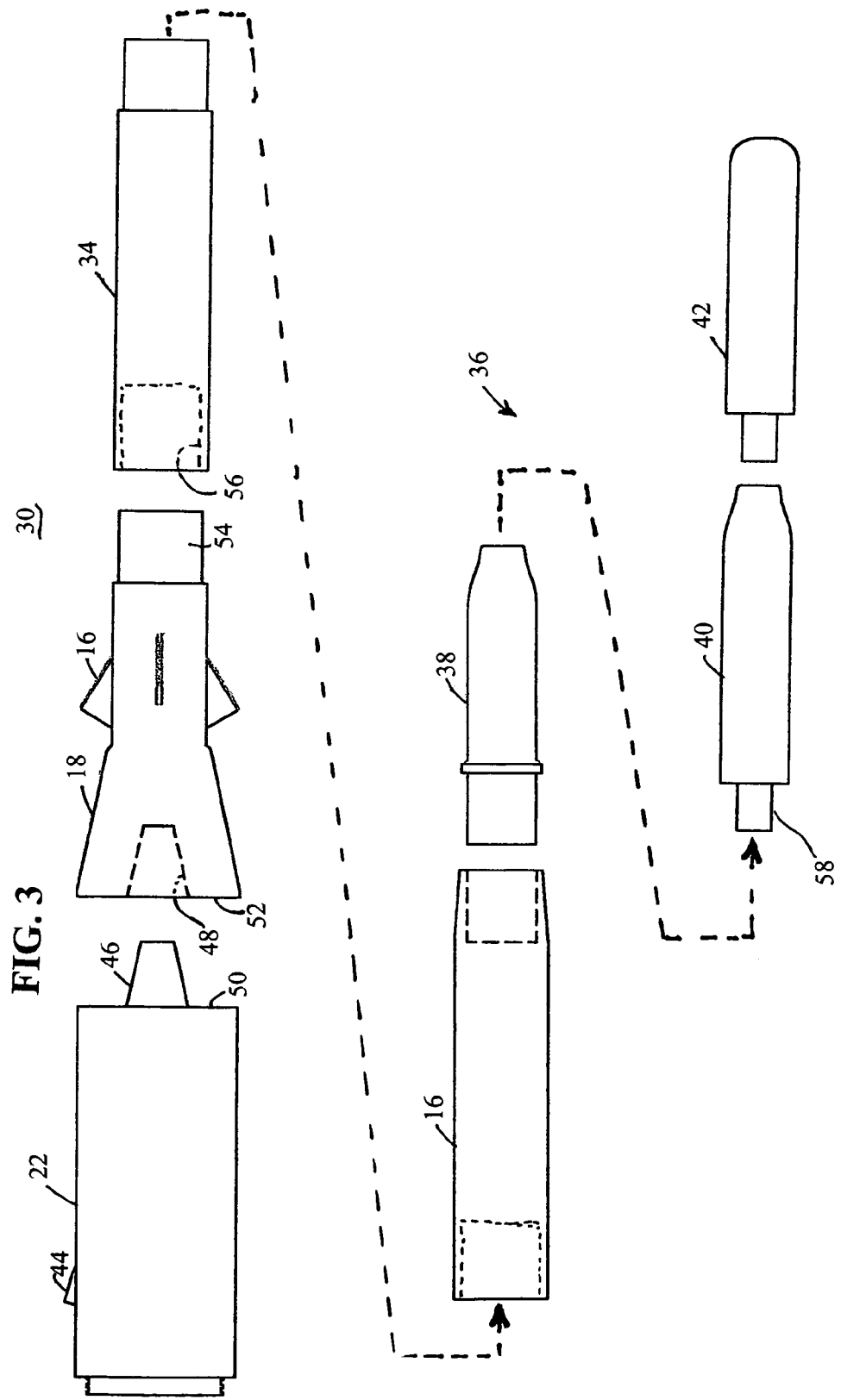
FIG. 3 illustrates various components of an articulated pipe train constructed according to one embodiment of the invention.

With reference to FIG. 2 of the drawings, there is illustrated an articulated lead train 30 constructed according to a preferred embodiment of the invention. The articulated lead train 30 is pushed by new sections of pipe, one of which is shown as numeral 32. Much like the rigid lead train described above, a heavy duty jack (not shown) pushes the rear-most new pipe section 32 which, in turn, push a trailing sleeve 22, a finned cracker/cone 18, a cracker extension 34 and a modified cracker lead 16. The modified cracker lead 16 is connected to an assembly 36 that allows the frontal portion of the lead train 30 to articulate and reliably follow an irregular or non-linear path of the old pipe 10. As will be described in more detail below, the articulated lead assembly 36 includes an articulated transition section 38, one or more articulated lead sections 40, and a capped articulated frontal section 42. As can be seen, the articulated lead train 30 has sufficient flexibility to follow a curved section of the old pipe train 10 for replacement.

With reference to FIG. 3, there are shown the details of the articulated lead train 30 according to an embodiment of the invention. The replacement pipes 32 (not shown in FIG. 3) are joined to the back of the trailing sleeve 22 by a suitable interface well known in the art. The trailing sleeve 22 may be equipped with a lubricant port 44 for allowing a lubricant to be dispensed during the pipe replacement operation. The front of the trailing sleeve 22 is fabricated with a truncated male cone 46 which fits within a truncated female cone receptacle 48 formed in the back of the cracker/cone 18. A flat face 50 of the trailing sleeve 22 abuts against a flat face 52 of the cracker/cone 18 when the components are forced together during the pipe replacement operation. A cracker extension 34 is fitted to the front of the finned cracker/cone 18. A male cylinder part 54 of the cracker/cone 18 snugly fits within a cylindrical female receptacle 56 of the cracker extension 34. The outside diameter of the cracker extension 34 is generally the same as that of the frontal portion of the cracker/cone 18.

The front of the cracker extension 34 mates with the back of a cracker lead 16 in the same manner as that between the cracker/cone 18 and the cracker extension 34. The cracker extension 34 and the cracker lead 16 have respective outside diameters generally matching that of the old pipe 10 to be replaced. As can be appreciated, the interface connections between the new pipe 32, the trailing sleeve 22, the cracker/cone 18, the cracker extension 34 and the cracker lead 16 are constructed to follow a straight and linear path of the old pipe 10. As noted above, a straight and linear path is not always the case where the old pipe 10 has settled or was originally not laid in a straight path.

The articulation of the trenchless pipe replacement technique is made possible by the use of an articulated transition section 38, an articulated lead section 40 and a capped articulated frontal section 42, all shown in FIG. 3. The back of the articulated transition section 38 is attached to the front of the cracker lead 16 by male and female cylindrical connections in the same manner as described above. The articulated transition section 38 is thus coupled to the cracker lead 16 so as not to depart from a linear path. However, the articulated sections 38, 40 and 42 are constructed to allow the same to follow an irregular path of the old pipe 10, whereupon the other components of the trenchless pipe replacement equipment 36 follow the irregular path.

Figure 6:
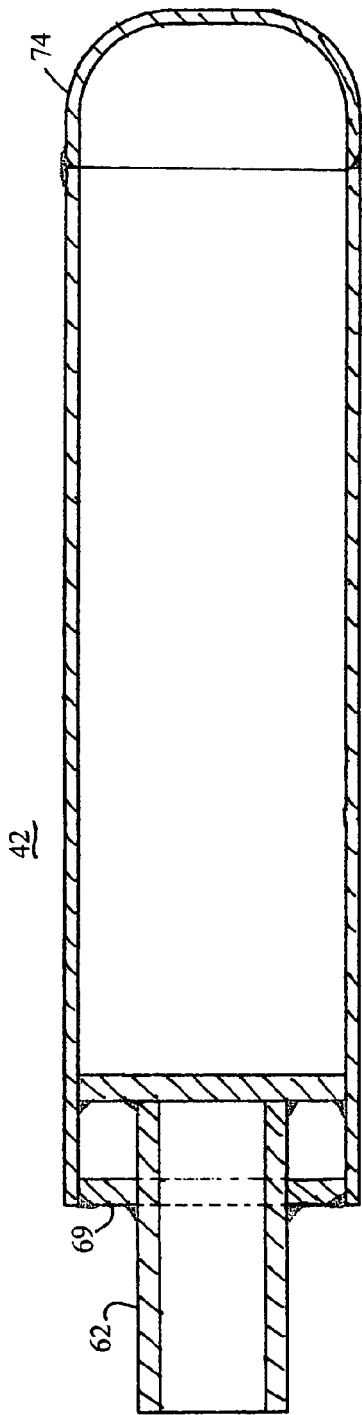
FIG. 6 is a cross-sectional view of a capped articulated frontal section of the lead train according to the invention.

The detailed construction of the articulated transition section 38 is shown in FIG. 4. The front of the articulated transition section 38 is constructed with a frontal bore 60 that allows the stub pipe 58 of the articulated lead section 40 to articulate, pivot or wobble therein. The stub pipe 58 welded to the back of the articulated lead section 40, shown in FIG. 5, fits within the frontal bore 60 of the articulated transition section 38. Similarly, a stub pipe 62 welded to the back of the capped articulated frontal section 42, shown in FIG. 6, fits within the frontal bore 64 of the articulated lead section 40. Thus, with the articulation lead assembly 36 shown in FIG. 3, there are two articulated joints in the frontal part of the trenchless pipe replacement lead train 36. More than two articulated joints can be employed by using multiple articulated lead sections 40. In addition, a single articulated joint can be employed by eliminating all of the articulated lead sections 40, and joining the capped articulated frontal section 42 directly to the articulated transition section 38.

Figure 7:
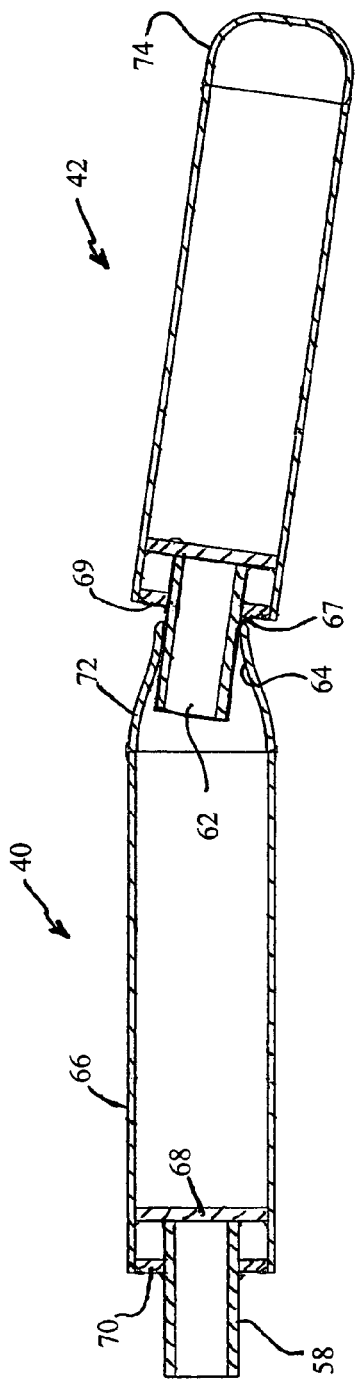
FIG. 7 is illustrates the articulation between two of the articulated components of the pipe train according to an embodiment of the invention.

The articulation of the assembly 36 according to the invention is shown in FIG. 7. Here, the articulated lead section 40 is illustrated constructed with a cylindrical body 66 constructed of a heavy duty steel, or other suitable material. Welded to the back of the body 66 of the articulated lead section 40 is an internal circular wall 68 and an end wall 70. The end wall 70 has a bore therein through which the stub pipe 58 extends. The stub pipe 58 is welded to both the internal wall 68 and to the end wall 70. Welded to the front of the cylindrical body 66 is a reducer 72 that is constructed with a diameter at the back end thereof that is the same as that of the body 66, and with a smaller diameter at the front end. The transition from the back end to the front end of the reducer 72 is curved in a convex manner, with an opening 64 at the front end. The opening 64 is somewhat larger than the diameter of the stub pipe 62 of the capped articulated frontal section 42. The capped articulated frontal section 42 is constructed very similar to that of the articulated lead section 40, except a blunt cap 74, rather than a reducer 72, is welded to the front end of the tubular body. The diameters of the articulated sections are generally smaller than that of the rigid cone expander sections.

With this joint arrangement, the articulated lead section 40 can pivot at any compass angle (when viewing the articulating joint axially) with respect to the capped articulated frontal section 42, and vice versa. By employing articulated sections, the capped articulated frontal section 42 can follow the meandering path of the old pipe 10. While short abrupt irregularities may be straightened by the stiffly coupled components, namely the trailing sleeve 22, the cracker/cone 18 and the cracker extension 34, more gradual irregularities will be followed by the entire trenchless pipe replacement equipment 30, whereupon the old pipe 10 will be replaced by the new pipe 32 without the path being substantially altered.

It is noted that the outside diameter of the lead sections is generally smaller than the inside diameter of the pipe to be replaced. Thus, the flexible coupling joint need not be of the type that requires transfer of the entire jacking force produced by the hydraulic jack. The force transferred from the articulated lead section 40 to the capped articulated frontal section 42, when flexed, is through the contact area 67. The contact area 67 is that which is between the annular edge of the opening 64 of the reducer 72 of the articulated lead section 40, and the back plate 69 of the capped articulated frontal section 42. The maximum degree or angle by which the stub pipe 62 can flex within the reducer 72 depends on the diameter of the stub pipe 62, the diameter of the opening 64 in the reducer 72, and the degree by which the reducer 72 is narrowed from the larger diameter thereof to the smaller diameter in which the opening 64 exists.

As can be appreciated, various articulated sections of different lengths can be mixed and matched to achieve the proper articulated apparatus for the application to be pursued. Indeed, those skilled in the art may desire to couple together other lead sections, including the cracker/cone 18, with articulating apparatus. In addition, while a certain type of articulating apparatus has been described, other articulating couplings can be employed. A universal joint type of coupling can be adapted for use with the invention, as well as a ball and socket type of coupling, and other couplings that allow one component to flex or bend with respect to the other component. A spring steel type of flexible joint can also be used with equal effectiveness.

It is also contemplated that the articulated lead sections could each be constructed with the stub pipe welded at the front of the section, and the reducer welded to the back of such lead section. The articulation between the lead sections would be the same as described above. While the preferred embodiment of the invention is well adapted for use with a trenchless pipe replacement apparatus adapted for being pushed with a hydraulic jack, the articulated lead sections can also be used with a trenchless pipe replacement system of the type using a percussion mole as the driving force to advance the pipe replacement apparatus in a forward direction. Articulating or flexible coupling joints may also be employed with pipe replacement systems in which the cone and replacement pipe are pulled through the old pipe for replacement of the same. In certain instances, those skilled in the art may find that operation can be enhanced by locking one or more of the articulating joints against pivotal movement. This can be accomplished by pinning the parts together, or by other suitable means.

In the embodiment of the invention illustrated in FIG. 7, it can be seen that the articulating joint is easily separated when the components are pulled apart. In order to prevent separation of the articulating components, so that the front-most component can be pulled through an old pipe line by a cable or the alike, the articulating joint can be made so that separation is not possible. In this event, the stub pipe of the frontal component can be inserted in the opening of the reducer. A stopper or knob-like enlargement can then be welded or otherwise attached to the end of the stub pipe so that the stub pipe cannot be removed from the opening in the reducer. In order to gain access to the end of the stub pipe for welding the knob thereon, while the stub pipe is in the body of the component having the reducer, the body of the component can be severed into front and back portions so the end of the stub pipe is accessible. The body halves of the component can thereafter be joined together by being pinned, bolted, welded, or by some other permanent means, or by some means to be able to again easily separate the body halves of the component.

An articulating joint well adapted for use when pulling the components of the articulating lead assembly, includes a ball and socket type of articulating joint. Here, a hemispherical-shaped stopper is welded to the end of the stub pipe. The frontal end wall of the reducer includes a hemispherical dished area surrounding an opening through which the stub pipe extends. The curved hemispherical surface of the stopper can rotate and/or pivot within the hemispherical dished area of the reducer end wall, but is captured in the body of the component.

Rather than pulling the articulated lead assembly by the front-most component of the articulating lead assembly, a cable can be threaded through the various components of the articulated lead assembly and connected to a hook or eye fastened to the cone/cracker, or fastened to one of the other components of the lead train. Obviously, when the lead train is pulled, rather than being pushed, the trailing sleeve and the other components should be fastened together so as not to be separated when pulled through the old pipe.

While the preferred and other embodiments of the invention have been disclosed with reference to specific articulated lead sections and corresponding structures, it is to be understood that many changes in detail may be made as a matter of engineering choices without departing from the spirit and scope of the invention, as defined by the appended claims.

What is claimed is:

1. Underground pipe replacement apparatus, comprising:
   a cone adapted for being forced through old underground pipe;
   a lead section assembly located in front of said cone, said lead section assembly including two or more lead section components connected together in a series, two said lead section components being coupled together with a flexible joint for allowing the lead section components to flex and follow an irregular path of the old underground pipe; and
   said flexible joint includes a pipe stub mounted to one lead section component, said pipe stub is insertable into an opening in an adjacent lead section component so as to allow the pipe stub to pivot within said opening and produce articulated movement therebetween.

2. The pipe replacement apparatus of claim 1, wherein said opening is located at an end of a reducer portion of the adjacent lead section.

3. The pipe replacement apparatus of claim 1, wherein said pipe stub is adapted for removal from said opening by pulling thereon.

4. The pipe replacement apparatus of claim 1, further including three lead section components, and two flexible joints, one said flexible joint coupling a first lead section component to a second lead section component, and a second flexible joint coupling a second lead section component to a third lead section component.

5. The pipe replacement apparatus of claim 1, further including a trailing sleeve located behind of said cone, and a cracker located in front of said cone, said cracker adapted for fracturing old pipes.

6. The pipe replacement apparatus of claim 5, further including a cracker extension coupled to a front of said cracker.

7. The pipe replacement apparatus of claim 1, further including apparatus for pushing the pipe replacement apparatus into the old underground pipe.

8. Underground pipe replacement apparatus for use with a cone expander, comprising:
   a first lead section coupled to a second lead section, said first and second lead sections situated in front of the cone expander, one said first or second lead section having a reducer attached thereto, and the other said first or second lead section having a stub pipe attached thereto, whereby when said stub pipe is inserted into said reducer, the first and second lead sections can be articulated with respect to each other.

9. The underground pipe replacement apparatus of claim 8, wherein the reducer is attached to a front of said first lead section, and the stub pipe is attached to a back of said second lead section.

10. The underground pipe replacement apparatus of claim 8, wherein at least one said lead reducer includes a reducer attached to one end thereof, and a stub pipe attached to the other end thereof.

11. The underground pipe replacement apparatus of claim 8, further including a transition section having a reducer attached to one end thereof, and a tubular member attached to the opposite end thereof.

12. The underground pipe replacement apparatus of claim 8, wherein one said lead section includes a cap attached to a front end thereof.

13. The underground pipe replacement apparatus of claim 8, further including apparatus for pushing the underground pipe replacement apparatus into old underground pipe.

14. A method of replacing old underground pipe with new pipe, comprising the steps of:
   forcing pipe replacement apparatus in the path of old underground pipe to break up the old pipe into pieces and pushing the old pipe pieces into the surrounding ground;
   following a path of the old underground pipe with articulated lead sections of the pipe replacement apparatus, whereby when the path of the old underground pipe departs from a linear path, the articulated lead sections of the pipe replacement apparatus follow the path and brings with said articulated lead sections the remainder of the underground pipe replacement apparatus; and
   articulating said lead sections by pivoting a pipe stub of one said lead section in an opening of an adjacent lead section.

15. The pipe replacement apparatus of claim 14, further including pushing the pipe replacement apparatus into the old underground pipe.

* * * * *